Patented July 20, 1937

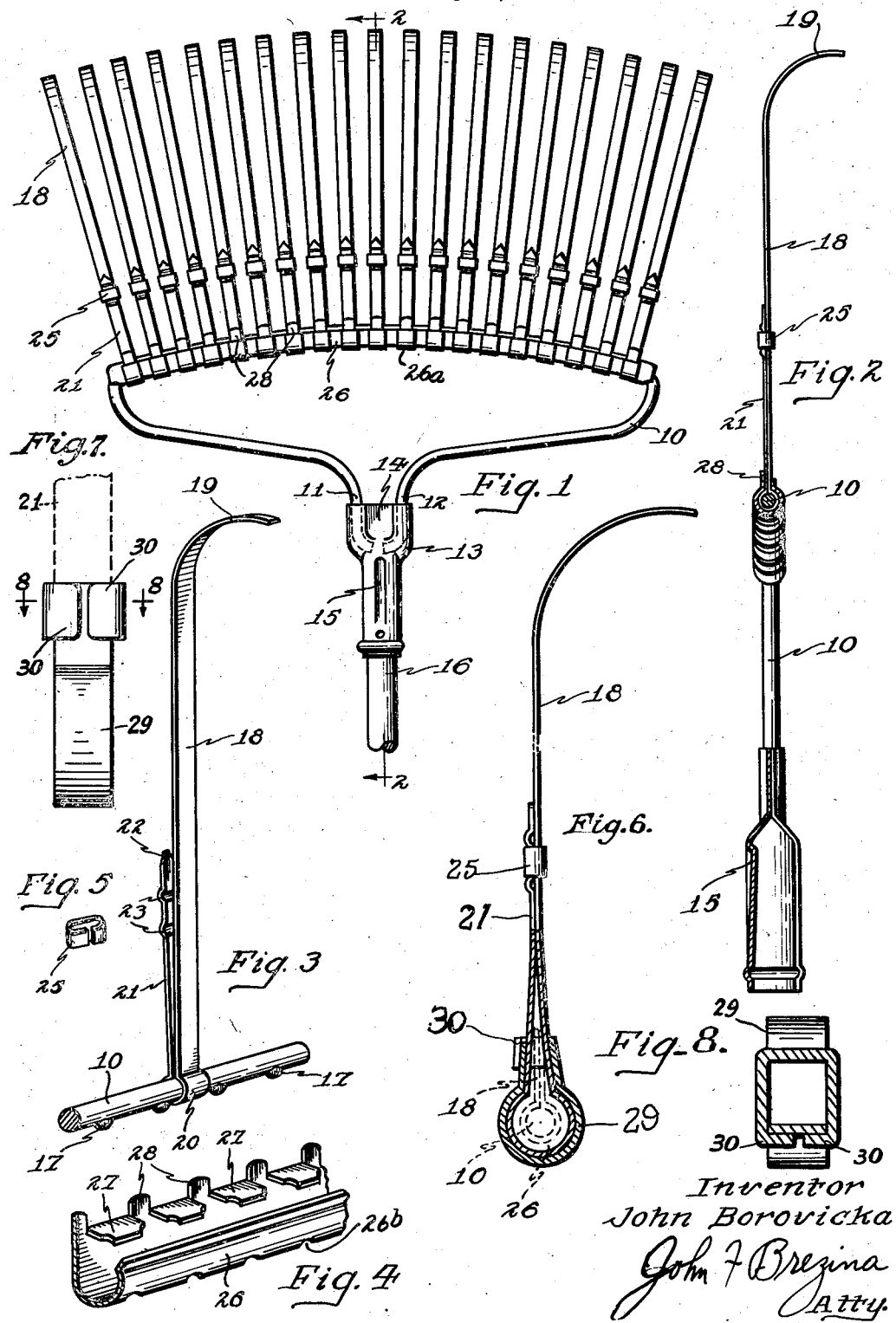

2,087,499

UNITED STATES PATENT OFFICE 2,087,499

LAWN RAKE

John Borovicka, Hubbard Woods, Ill.

Application May 16, 1935, Serial No. 21,753

13 Claims. (Cl. 55—114)

This invention relates to an all metal rake, adapted particularly for use in lawns, ground or garden work and the like, and wherever tines having the maximum resilience and durability are desirable.

An important object of my invention is the provision of a rake of economical and inexpensive metal construction having a curved metal frame securely mounted in a metal handle-receiving element, and having a plurality of spaced apart tines made of spring steel which are curved downwardly at their ends and which are mounted to said frame in a novel manner.

A further object of my invention is the provision of a metal rake for lawns or the like wherein a curved metal frame has securely mounted thereon a plurality of spring steel tines, each of said tines having its secured ends bent about and encircling the frame and the end of the tine bent and held in superposition adjacent position immediately above the main portion of the tine and thereby acting as a reenforcing spring against the normal bending movement of the tine per se.

A further object of my invention is the provision of a rake construction wherein each metal tine, preferably made of spring steel, encircles the rake frame at an intermediate point of the tine and the end thereof is positioned immediately above and adjacent to the main portion of the tine for a short distance from the rake frame, each of said superpositioned ends being pointed and acting in a manner similar to an upper leaf in a spring.

A further object of my invention is the provision of a rake construction wherein a plurality of tines are securely mounted against rotative movement about a frame, and wherein a longitudinal channel member having a serrated edge is securely compressed about the curved portion of the rake on which the tines are mounted in such a manner that the tines are securely clamped on the frame and held against movement in any direction, serrated portions of said channel member extending along, above and immediately adjacent to each tine to reenforce the same in normal action.

A further object of my invention is the provision of inexpensive and economical spring steel tines for a rake or the like which are quickly mountable and demountable upon a frame and which have one end thereof bent about the frame and back upon the tine itself to act as a reenforcing leaf spring.

Other and further objects of my invention will be apparent from the following specification and claims.

This invention (in a preferred form) is illustrated in the following described combination and arrangement of parts, reference being had to the accompanying drawing, in which:

On the drawing:

Fig. 1 is a top plan view of my rake showing most of the handle broken away.

Fig. 2 is a cross sectional view taken from the left of Fig. 1 and on line 2—2 of said Fig. 1.

Fig. 3 is an enlarged perspective view of one of my tines mounted upon a small segment of the rake frame.

Fig. 4 is a perspective enlarged view of a portion of the channel clamping member of my invention and which is used to securely mount the respective tines in position on the rake frame.

Fig. 5 is an enlarged perspective view of a clamping collar which secures the back-turned end of the tine to the main portion thereof.

Fig. 6 is an enlarged cross sectional view of a slightly modified form of spring steel tine which is adapted to be quickly mounted upon my rake to replace a tine which may be broken.

Fig. 7 is a fragmentary and side elevational view of the slightly modified form of tine and holding means of Fig. 6 taken from the right-hand side of Fig. 6. Fig. 8 is a cross sectional view taken on line 8—8 of Fig. 7.

The reference numeral 10 indicates a metal frame made of a single continuous rod bent into the shape shown in Fig. 1 and so that its opposite ends 11 and 12 extend substantially perpendicularly to the frame per se.

Said ends are firmly secured in one end of a tube-like handle receiving socket 13. The opposite sides of one end of the socket 13 are firmly compressed together as at 14 to securely hold the adjacent ends of head frame 10.

The remainder of the socket 13 is substantially circular in cross section and has its walls pressed inwardly on opposite sides thereof to form inwardly extending and inclined abutments 15, the inner surface of which said abutments are adapted to engage, wedge in and hold one end of a suitable removable handle indicated by reference numeral 16.

The normally forward portion of the head frame 10 of said rake which is between the opposite ends thereof has formed thereon and integral therewith a plurality of uniformly spaced apart abutments 17, these being preferably formed by compressing together the sides of the metal rod, as clearly indicated in Fig. 3.

A very important feature of my invention comprises the novel construction of tines employed and the manner of mounting and holding the same with respect to the head frame. An enlarged perspective view of one of said tines is shown in Fig. 3 and is indicated by reference numeral 18. Each of said tines is formed of a good quality spring steel to give the desired degree of yieldability. Each of said tines, when first formed, are bent at an intermediate point to form an annular collar 20, the bent portion 21 of the tine being doubled back upon itself to lie upon and immediately adjacent to the main portion of the tine 18 as clearly shown in the drawing. The bent back portion of the tine 21 has its end pointed to a central apex 22, as clearly shown in Fig. 3, said apex normally lying immediately over the center of the main portion of tine 18. Two spaced apart crimps 23 are formed in said bent back tine portion 21 at a point a short distance from the apex 22, these serving to hold a metal collar 25 in permanent position, said collar 25 holding tine portion 21 immediately adjacent tine 18 and preventing material such as grass, weeds, etc., from wedging beneath tine portion 21. Numeral 19 designates the free curved end of each tine.

In making my novel rake I mount the tines on head frame 10 so that the collar 20 of each tine lies between each two adjacent abutments 17 respectively, said abutments extending in the opposite direction to the tine and into the small apertures formed in the channel member hereinafter described, said engagement preventing rotation of said channel member and tines on said frame 10.

Fig. 4 shows an enlarged perspective view of the channel member 26 which comprises the clamping means for securely holding the tines on frame 10 as well as in spaced apart position. Apertures 26b are formed in longitudinal alinement in channel member 26 opposite the open side thereof as indicated in Fig. 4. One edge of said metal channel member 26 is slit at uniformly spaced apart points and die-cut and bent perpendicularly to form a plurality of perpendicularly extending integral spacing elements 27 which preferably have their outer corners sheared as shown in the drawing. Each of the spacing elements 27 is directly opposite one of the apertures 26b of channel member 26. Simultaneously a plurality of shorter integral spaced apart tongues 28 are formed in the same plane with the die-cut edge of the channel member 26, and remain in a position perpendicular to the spacer elements 27. Numeral 26a indicates the shoulders forming a part of channel member 26, these being formed by depressing said channel member about each tine. 26b indicates apertures formed in the curved portion of channel member 26 as shown.

After the tines have been mounted on head frame 10 as heretofore indicated, channel member 26, which is of form to extend from one end of said head frame to the other end, is slipped about said head frame over the said collar portions of said tines and so that each tine lies in a space between two adjacent spacer elements 27. The tongue 28 lies immediately upon the bent back portion 21 of tine 18. The channel member is then firmly pressed about said tines and said frame to firmly hold said tines in clamped position thereon, as clearly shown in Figs. 2 and 6.

In addition to the inexpensive and practical described manner of securing the tines with respect to the head frame 10, an important feature of my construction is that the spring steel portion 21 of each tine 18 acts as a leaf spring to correctly resist, with the proper degree, the backward flexing action of the spring steel tine 18 in the same manner as an upper leaf in a spring, and thereby preventing excessive stress and bending of the leaf spring at points adjacent its mounting on the rake frame. Failure of structures heretofore made has largely been due to the fact that the bending stresses were confined to a substantially small area adjacent the point of mounting of the tine, thereby resulting in quick breakage of the tine. Further, the backward bending stresses in my construction are absorbed over a relatively large area due to the fact that the upper and bent back portion 21 of each tine is pointed, and in addition said bent back portion 21 will upon yielding slide along the surface of tine 18 when it is bent back.

A further important feature of my described construction is that the tongues 28 of the channel clamping member 26 additionally reenforce the respective bent back portion 21 and assist in resisting excessive backward flexing action of the tine and likewise distribute such bending stresses over a sufficiently large area so that the same will not break in reasonable use.

Figs. 6, 7 and 8 show a slightly modified construction for mounting a replaceable tine on the rake frame. This modified construction is for the purpose of providing means for quickly remounting an additional tine upon the rake heretofore described and to replace a tine which has been broken. The tine 18 per se is the same as heretofore described having its back-turned portion 21 securely held against the main portion of the tine by means of collar 25, said tine being merely slipped over the pressed together channel member 26 at the point where the tine is desired to be replaced. After said tine has been slipped over and clamped together in the position indicated in Fig. 6, a collar 29 which is shown in cross section substantially like capital letter G and which has a pair of oppositely and transversally extending tongues 30, said collar 29, shown in cross section in Fig. 6, is pressed and clamped about the collar portion 20 of the tine 18, said collar 29 having a pair of transversally opposite extending integral tongues 30, one of which is shown in Figs. 6, 7 and 8. Each of said tongues 30 is bent about the edges of the tine 18 and over the opposite end of collar 29 to securely hold the same from spreading and in clamped position.

I am aware that numerous details of construction may be varied through a large range and I do not desire that my invention be limited to the specific details of construction described.

I claim as my invention:

1. A rake comprising a metal head formed of a continuous rod terminating in adjacent bent ends; a handle socket in which said head ends are securely mounted, said rod having a plurality of spaced apart integral abutments thereon, a plurality of flat spring tines securely mounted on said metal head and in substantially parallel and spaced apart position, each of said tines having its free end curved downwardly and having its other end bent back upon itself and forming a loop adapted to encircle the head frame, said bent back end normally lying upon and adjacent to the said main portion of the tine; and means for securely holding a plurality of tines clamped on said head and in substantially uniform spaced apart position.

2. A rake of the class described, consisting of a head member comprising a single continuous metal rod with its ends in substantially adjacent position; a handle receiving socket in which said ends are secured; and a plurality of flat spring steel tines secured on said head member, each of said tines having a loop formed intermediate its ends and one end thereof being bent back upon itself adjacent to the main portion thereof, said tine loops encircling said head in spaced apart relation; and a channel-like clamping member secured about said looped ends for holding each of said tines in securely clamped position on said head.

3. In combination with a rake having a metal head frame, a plurality of flat metal tines securely mounted thereon to permit flexing and resilient action thereof, each of said tines being bent back upon itself at an intermediate point to form a loop encircling said frame and the bent back end thereof lying upon and against the main portion of the tine to reenforce the same against flexing action; and a clamping member securely mounted about said looped ends and frame to securely hold said tines in position.

4. In combination with a rake having a metal head frame, a plurality of tines securely mounted thereon to permit flexing and resilient action thereof, each of said tines being bent back upon itself to form an end loop encircling said frame and the bent back end thereof lying upon and against the main portion of the tine to reenforce the same; and a metal collar on each of said tines for holding the upper bent back reenforcing end adjacent to the main portion of the tine; and a channel-like clamping member securely mounted about said looped ends and frame to securely hold said tines in proper position with respect to said frame.

5. A rake comprising a metal head frame head formed of a single continuous rod and having its ends substantially adjacent to each other; a handle receiving socket in which said adjacent head frame ends are secured; a plurality of integrally formed abutments on the rearward side of said head frame head; and a plurality of flat spring steel tines mounted on the forward portion of said head frame head, each of said tines being bent back upon itself at an intermediate point thereof to form a loop, said loop of each tine encircling said head frame head and one of said abutments, an apertured clamping member for securely holding said tines on said frame head, said abutments engaging and extending into said clamping member apertures for preventing rotation thereof, said bent-back end of each tine normally lying upon and adjacent to the main portion thereof.

6. A rake comprising a metal frame formed of a single continuous rod and having its ends substantially adjacent to each other; a handle receiving socket in which said adjacent frame ends are secured, a plurality of integrally formed abutments on said frame; a plurality of flat spring steel tines mounted on the forward portion of said frame, each of said tines being bent back upon itself at an intermediate point thereof to form a loop, said loop encircling said frame, said bent-back end normally lying upon and adjacent to the main portion of said tine; and a clamping member securely mounted about said looped ends and said frame for securely holding said tines on said frame, said frame abutments engaging said clamping member to prevent movement and rotation thereof.

7. A rake comprising a metal frame formed of a single continuous rod and having its ends substantially adjacent to each other; a handle-receiving socket in which said adjacent frame ends are secured; a plurality of integrally formed abutments on the forward side of said frame; a plurality of flat spring steel tines mounted on the forward portion of said frame, each of said tines being bent back upon itself to form an end loop, said loop encircling said frame, said bent-back end being secured upon and adjacent to the main portion of said tine; a channel clamping member encircling and pressing about said tines and said frame, and a plurality of tongues on said channel clamping member, each of said tongues being adapted to lie upon the bent back portion of each tine and to reenforce the same against flexing action; said frame abutments engaging said clamping member to prevent movement thereof.

8. A rake comprising a metal frame formed of a single continuous rod and having its ends substantially adjacent to each other; a handle-receiving socket in which said adjacent frame ends are secured; a plurality of integrally formed abutments on the forward side of said frame; a plurality of flat spring steel tines mounted on the forward portion of said frame, each of said tines being bent back upon itself to form an end loop, said loop encircling said frame, said bent-back end being slidably secured upon and adjacent to the main portion of said tine; a channel clamping member encircling and pressing about said tines and said frame; said clamping member having a plurality of spaced apart serrations bent angularly between said tines respectively and acting as spacers therefor, said frame abutments engaging said clamping member to prevent movement thereof and a plurality of tongues formed integrally with said channel clamping member and extending along and upon the respective bent-back portions of said tines to reenforce the same against flexing action.

9. In a rake, a metal head frame; a handle connected thereto; a plurality of flexible metal tines mounted on said head frame in spaced apart relation to extend in a common direction and in substantially the same plane, each of said tines being bent back upon itself at an intermediate point to form a loop, said loop of each tine encircling said head frame; and a metal collar encircling the looped end of each of said tines for clamping and holding said tine in position on said head frame.

10. In combination with a rake having a metal head frame, a handle socket and handle connected together; a plurality of flat flexible metal springable tines mounted in spaced apart position on said head frame and in substantially a common plane; each of said tines having one end thereof doubled back upon itself to form a loop, said loop of each tine being mounted on said head frame; and a metal clamping member about the looped portion of each of said tines normally compressing said looped ends to hold the same in position on said head frame, each said metal clamping member being individually removable.

11. In combination with a rake having a metal head frame, a handle socket and handle connected together; a plurality of flat flexible metal springable tines mounted in spaced apart position on said head frame and in substantially a common plane; each of said tines having one end thereof doubled back upon itself to form a loop, said loop of each tine being mounted on said head frame; and a metal channel-like clamping member pressed about the looped ends of said tines to hold the same in position on said head frame.

12. In combination with a rake having a metal head frame; a handle socket and handle connected together; a plurality of flat flexible metal springable tines mounted in spaced apart position on said head frame and in substantially a common plane, each of said tines having one end thereof doubled back upon itself to form a loop; said doubled back portion of each of said tines normally lying upon and adjacent to the main portion thereof to springably reinforce the same against flexing action; said loop of each tine being mounted on said head frame; and a metal clamping member about the looped ends of said tines normally compressing said looped ends on said head frame to hold the same in position on said head frame, each said metal clamping member being individually removable.

13. In combination with a rake having a metal head frame, a handle socket and handle connected together; a plurality of flat flexible metal springable tines mounted in spaced apart position on said head frame and in substantially a common plane; each of said tines having one end thereof doubled back upon itself to form a loop, said loop of each tine being mounted on said head frame; and a metal clamping member about the looped ends of each of said tines to hold the same in position on said head frame, each of said metal clamping members being individually removable, each of said clamping members being C shaped in cross section and having integral fingers on one end thereof adapted to be bent to engage the opposite end thereof.

JOHN BOROVICKA.